(12) United States Patent
Choi (10) Patent No.: US 9,108,696 B2
(45) Date of Patent: Aug. 18, 2015

(54) FRAME UNIT FOR BICYCLE AND METHOD OF MANUFACTURING THE SAME

(71) Applicant: Hyundai Motor Company, Seoul (KR)

(72) Inventor: Jungnam Choi, Whasung-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/144,220

(22) Filed: Dec. 30, 2013

(65) Prior Publication Data

US 2015/0048591 A1  Feb. 19, 2015

(30) Foreign Application Priority Data

Aug. 16, 2013 (KR) .......................... 10-2013-0097430

(51) Int. Cl.
  *B62K 19/08* (2006.01)
  *B21D 53/86* (2006.01)
  *B62K 19/20* (2006.01)

(52) U.S. Cl.
  CPC ............... *B62K 19/08* (2013.01); *B21D 53/86* (2013.01); *B62K 19/20* (2013.01)

(58) Field of Classification Search
  CPC ............................... B62K 19/08; B62K 19/20
  USPC .......................................... 280/288.3, 281.1
  See application file for complete search history.

(56) References Cited

U.S. PATENT DOCUMENTS

| | | | | | |
|---|---|---|---|---|---|
| 2,089,889 | A | * | 8/1937 | Giordani | 280/288.3 |
| 2,378,961 | A | * | 6/1945 | Wallace et al. | 280/288.3 |
| 2,827,306 | A | * | 3/1958 | Roder | 280/288.3 |
| 4,613,146 | A | * | 9/1986 | Sharp et al. | 280/288.2 |
| 5,011,172 | A | | 4/1991 | Bellanca et al. | |
| 5,464,240 | A | * | 11/1995 | Robinson et al. | 280/281.1 |
| 5,769,442 | A | * | 6/1998 | Robinson et al. | 280/281.1 |
| 5,791,673 | A | * | 8/1998 | Patterson | 280/281.1 |
| 5,913,529 | A | * | 6/1999 | Patterson | 280/281.1 |
| 6,109,638 | A | * | 8/2000 | Colegrove | 280/288.3 |
| 7,971,892 | B2 | * | 7/2011 | Sasnowski et al. | 280/288.3 |

FOREIGN PATENT DOCUMENTS

| | | | | | |
|---|---|---|---|---|---|
| GB | 2278814 A | * | 12/1994 | | B62J 17/00 |
| KR | 10-1116641 B1 | | 3/2011 | | |
| KR | 10-2012-0019777 A | | 3/2012 | | |

\* cited by examiner

*Primary Examiner* — Kevin Hurley
(74) *Attorney, Agent, or Firm* — Morgan, Lewis & Bockius LLP (57) ABSTRACT

A frame unit for a bicycle includes: a left frame body in which a part of a head tube, a part of a seat tube, a part of a frame, and a left stay are integrally formed; and a right frame body in which a part of the head tube, a part of the seat tube, a part of the frame, and a right stay are integrally formed, in which the left frame body and the right frame body are coupled so as to integrally form the head tube, the seat tube, and the frame, flanges are formed to be inclined along edges of the left frame body and the right frame body, respectively, and the left frame body and the right frame body are coupled through the flanges.

10 Claims, 6 Drawing Sheets

FRAME UNIT FOR BICYCLE AND METHOD OF MANUFACTURING THE SAME

CROSS-REFERENCE TO RELATED APPLICATION

The present application claims priority of Korean Patent Application Number 10-2013-0097430 filed Aug. 16, 2013, the entire contents of which application is incorporated herein for all purposes by this reference.

BACKGROUND OF INVENTION

1. Field of Invention

The present invention relates to a frame unit for a bicycle and a method of manufacturing the same, and more particularly, to a frame unit for a bicycle which includes a head tube, a seat tube, a frame, and left and right stays and a method of manufacturing the same.

2. Description of Related Art

In general, a frame unit for a bicycle is a constituent component that forms an overall structure of a bicycle, and manufactured by mutually joining constituent components such as a head tube, a seat tube, a frame, and left and right stays.

Regarding the frame unit for a bicycle, securement of differentiation in design and rigidity for safety are core factors, and to this end, the respective manufacturers actively conduct researches on development of technologies, process methods, materials, and the like.

Recently, in order to secure differentiation in design and rigidity for safety, materials such as aluminum, chromium-molybdenum steel, carbon, and titanium are used instead of a high tensile steel material that is generally used.

Figure 1:
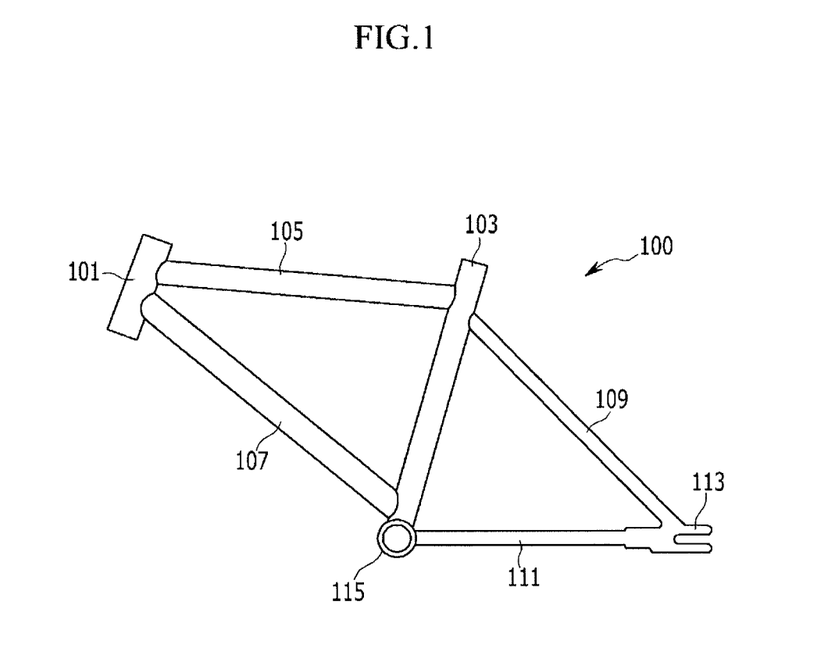
FIG. 1 is a configuration diagram of a frame unit for a bicycle according to the related art.

FIG. 1 is a configuration diagram of a frame unit for a bicycle according to the related art.

Referring to FIG. 1, a frame unit 100 for a bicycle of the related art includes a head tube 101, a seat tube 103, an upper frame 105, a lower frame 107, and upper and lower stays 109 and 111 disposed at both sides.

A steering shaft (not illustrated) to which a steering handle is connected is installed on the head tube 101, and a seat pipe (not illustrated) connected to a seat is installed on the seat tube 103.

The upper and lower frames 105 and 107 connect and support the head tube 101 and the seat tube 103.

Rear ends of both the upper and lower stays 109 and 111 are connected to each other so as to form a rotating body fork 113 to which a rear wheel is mounted.

A front end of the lower stay 111 is connected to a pedal assembly 115 that is configured at a lower end of the seat tube 103.

Meanwhile, the frame unit 100 for a bicycle mostly includes both the upper frame 105 and the lower frame 107, but in some cases, only a single frame, that is, only the upper frame 105 may be applied between the head tube 101 and the seat tube 103.

However, according to the frame unit 100 for a bicycle of the related art, which has the aforementioned configuration, when the head tube 101 is joined to the upper frame 105 or front ends of the upper and lower frames 105 and 107 by a welding process, residual stress due to welding heat is distributed to joining portions. Particularly, impact loads are directly applied when the bicycle runs, thereby causing a serious problem with respect to safety such as cracks or damage occurring at the periphery of the joining portions.

In addition, since the process of welding the joining portions is manually performed, an inferiority rate is high because there is a difference in welding quality in accordance with skill of workers and working environment, and thereby, there are drawbacks in that an excessive working time is required and productivity deteriorates.

In addition, when the head tube 101, the seat tube 103, the upper frame 105, the lower frame 107, and the upper and lower stays 109 and 111 disposed at both sides, which form the frame unit 100 for a bicycle, are joined to each other by a welding process, weld beads protrude at the joining portions between the respective components, thereby causing deterioration in overall aesthetic appearance because of heterogeneity between the respective components.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a frame unit for a bicycle including: a left frame body in which a part of a head tube, a part of a seat tube, a part of a frame, and a left stay are integrally formed; and a right frame body in which a part of the head tube, a part of the seat tube, a part of the frame, and a right stay are integrally formed, in which the left frame body and the right frame body are coupled so as to integrally form the head tube, the seat tube, and the frame, flanges are formed to be inclined along edges of the left frame body and the right frame body, respectively, and the left frame body and the right frame body are coupled through the flanges.

A joining groove portion may be formed between the flanges, and the left frame body and the right frame body may be welded and coupled by inserting a filler metal into the joining groove portion.

The frame unit for a bicycle may further include extension ends formed to be extended from ends of the respective flanges of the left and right frame bodies and coming into contact with each other.

The extension ends may be adhered to each other by applying an adhesive on the respective extension ends.

Various aspects of the present invention provide for a method of manufacturing a frame unit for a bicycle including a head tube to which a steering shaft is installed, a seat tube to which a seat pipe is installed, a frame configured to integrally connect the head tube and the seat tube and form a body of a bicycle, and left and right stays formed at the rear of the frame, the method including: press-forming a left frame body so that a part of the head tube, a part of the seat tube, a part of the frame, and the left stay are integrally formed, and a flange is formed to be inclined along an edge of the left frame body; and press-forming a right frame body so that a part of the head tube, a part of the seat tube, a part of the frame, and the right stay are integrally formed, and a flange is formed to be inclined along an edge of the right frame body, in which the left and right frame bodies are coupled through the respective flanges.

A joining groove portion may be formed between the flanges, and the left frame body and the right frame body may be welded and coupled by welding the left frame body and the right frame body through the joining groove portion.

The left frame body and the right frame body may be welded and coupled by inserting a filler metal into the joining groove portion.

The joining groove portion may be formed as a V-shaped groove by the flanges facing each other.

The respective flanges of the left and right frame bodies may be extended to form extension ends, an adhesive may be applied on each of the extension ends, and the extension ends may be adhered to each other by welding heat generated at the joining groove portion.

The respective flanges of the left and right frame bodies may be extended to form extension ends, and the extension ends may be adhered to each other by applying an adhesive on the respective extension ends.

According to various aspects of the present invention, the left and right frame bodies, which form the head tube, the seat tube, the frame, and the left and right stays, respectively, are integrally press-formed and coupled, thereby facilitating a manufacturing process.

Particularly, rigidity and durability between the head tube and the frame with respect to an impact load transmitted from a road surface and a fatigue load of the frame unit per se are firmly maintained, thereby preventing damage such as cracks, and securing safety.

In addition, the head tube, the seat tube, the frame, and the left and right stays, which form the left and right frame bodies, are integrally formed, thereby making the entire external appearance of the frame unit for a bicycle be aesthetically attractive.

In addition, welding work is performed along edges of the left and right frame bodies when the left and right frame bodies are joined, such that welding processes may be easily automated, working times may be reduced due to the automation, and welding quality and productivity may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A part irrelevant to the description will be omitted to clearly describe the present invention, and the same or similar elements will be designated by the same reference numerals throughout the specification.

The size and thickness of each component illustrated in the drawings are arbitrarily shown for understanding and ease of description, but the present invention is not limited thereto. Thicknesses of several portions and regions are enlarged for clear expressions.

Further, in the following detailed description, names of constituents, which are in the same relationship, are divided into "the first", "the second", and the like, but the present invention is not limited to the order in the following description.

Throughout the specification and the claims, unless explicitly described to the contrary, the word "comprise" and variations such as "comprises" or "comprising" will be understood to imply the inclusion of stated elements but not the exclusion of any other elements.

In addition, "unit", "means", "part", "member", or the like, which is described in the specification, means a unit of a comprehensive configuration that performs at least one function or operation.

Figure 2:
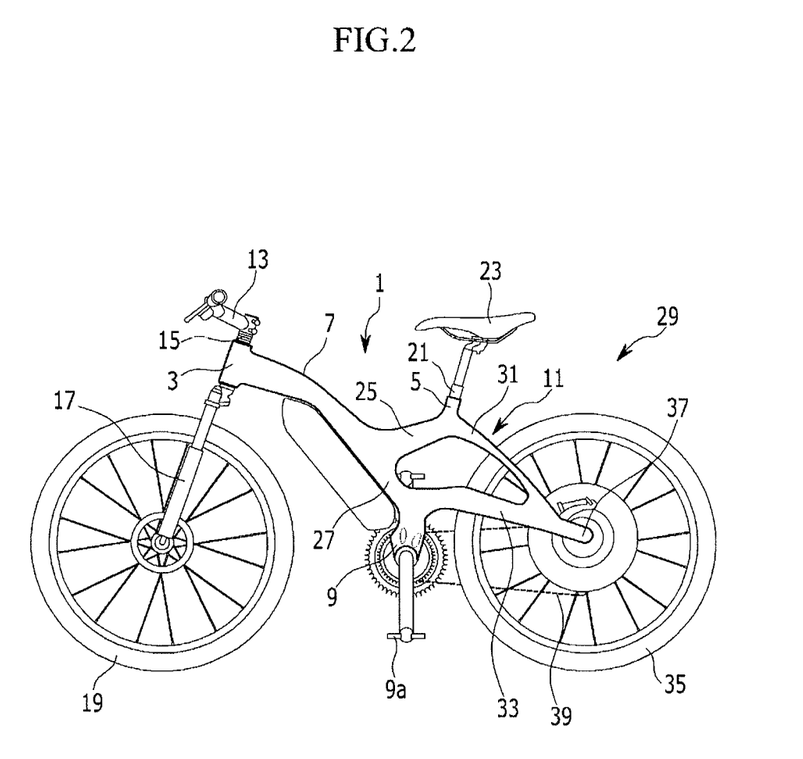
FIG. 2 is a side view of a bicycle to which an exemplary frame unit for a bicycle according to the present invention is applied.
Figure 3:
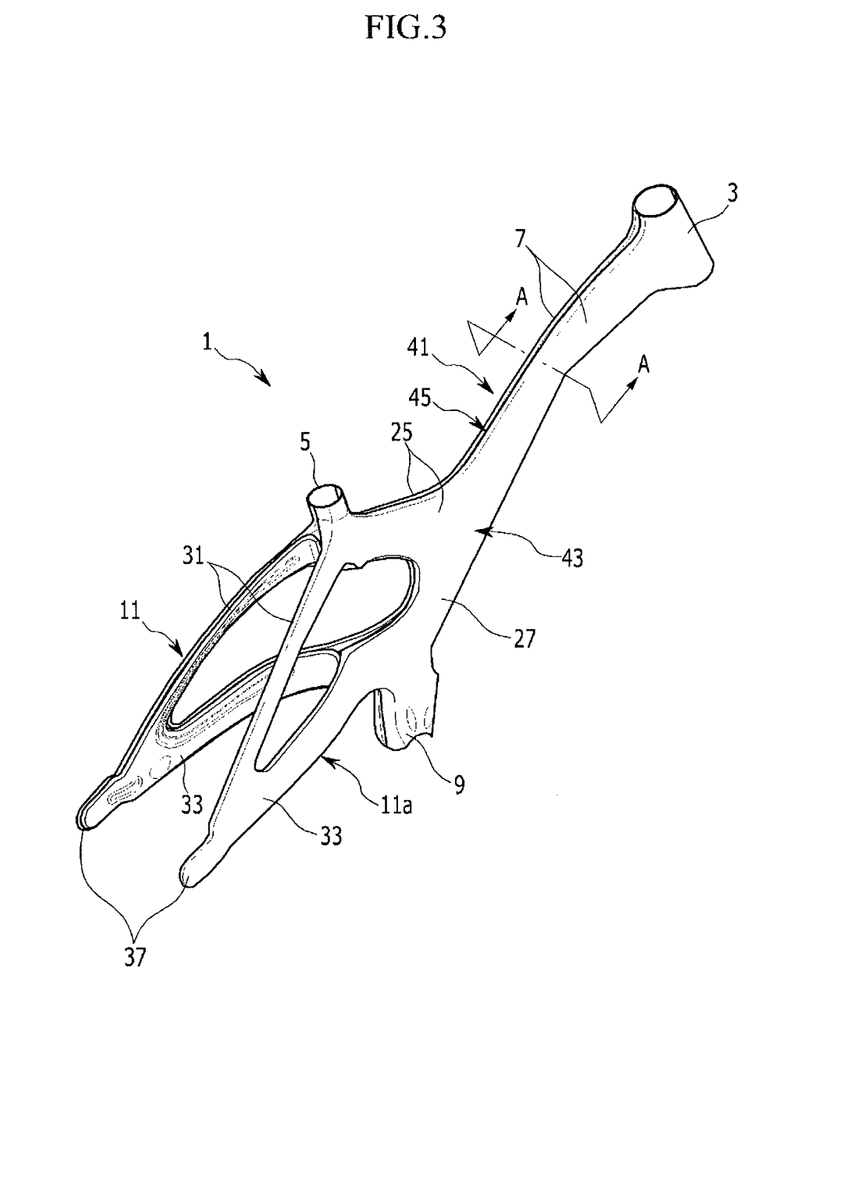
FIG. 3 is a perspective view of an exemplary frame unit for a bicycle according to the present invention.
Figure 4:
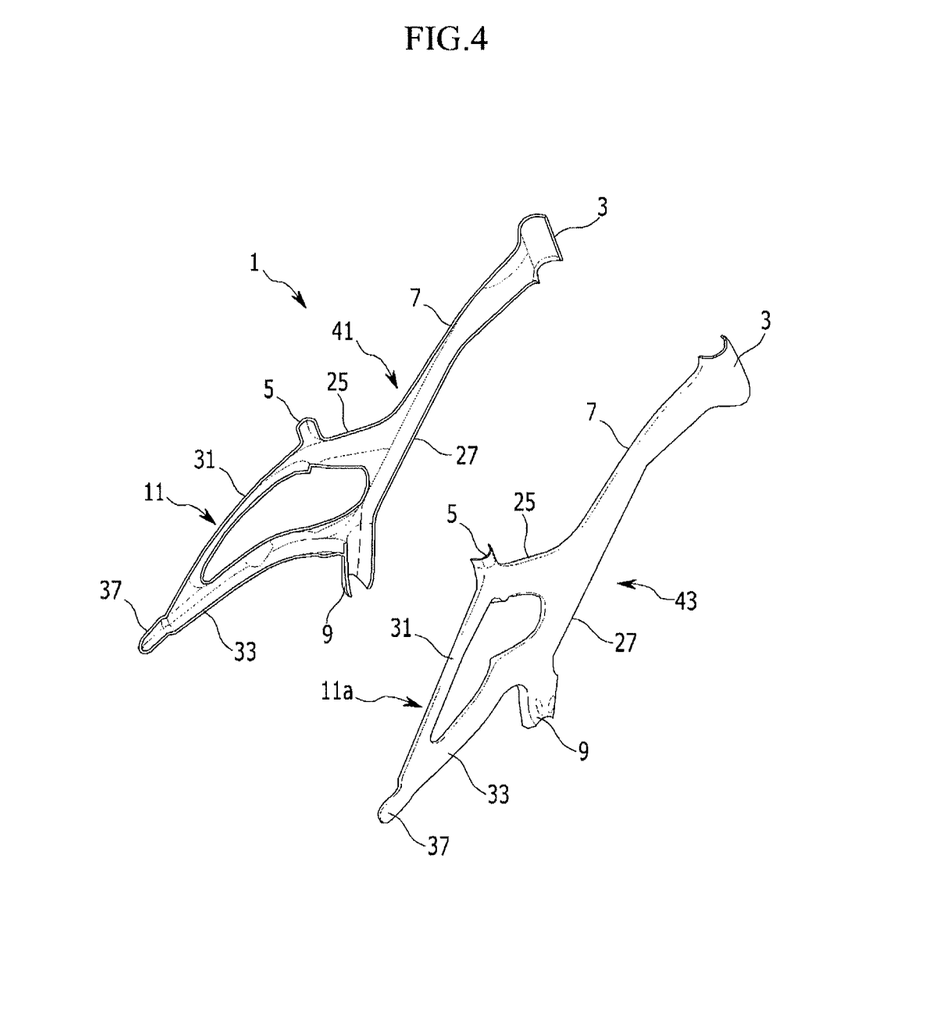
FIG. 4 is an exploded perspective view of an exemplary frame unit for a bicycle according to the present invention.

FIG. 2 is a side view of a bicycle to which a frame unit for a bicycle according to various embodiments of the present invention is applied, FIG. 3 is a perspective view of the frame unit for a bicycle according to various embodiments of the present invention, and FIG. 4 is an exploded perspective view of the frame unit for a bicycle according to various embodiments of the present invention.

Referring to FIGS. 2 to 4, a frame unit 1 for a bicycle according to various embodiments of the present invention includes a head tube 3, a seat tube 5, a frame 7, a pedal assembly 9, and left and right stays 11 and 11a.

A steering shaft 15 to which a handle 13 is mounted is installed to the head tube 3, and a front wheel 19 is installed by a fork 17 configured at a lower side of the steering shaft 15.

A seat 23 is installed to the seat tube 5 by a seat pipe 21.

The frame 7 may include an upper extension frame 25 configured to integrally connect the head tube 3 and the seat tube 5, and a lower extension frame 27 integrally connected to the pedal assembly 9, and forms a body of a bicycle 29. One will appreciate that such integral components may be monolithically formed.

The left and right stays 11 and 11a include an upper stay 31, and a lower stay 33, respectively, and rear ends of both the upper stays 31 and rear ends of both the lower stays 33 are connected to each other so as to form a rotating body fork 37 to which a rear wheel 35 is mounted.

Further, front ends of both the upper stays 31 are connected to the seat tube 5, and front ends of both the lower stays 33 are connected to the pedal assembly 9 configured at a lower side of the seat tube 5.

The pedal assembly 9 may be formed to protrude downward at a lower side between the frame 7 and both the lower stays 33, and a pedal 9a, which is connected to the rear wheel 35 by a chain 39, is installed on the pedal assembly 9.

Here, the head tube 3, the seat tube 5, the frame 7, the pedal assembly 9, and the left and right stays 11 and 11a are formed by a left frame body 41 and a right frame body 43, which are integrally formed. One will appreciate that such integral components may be monolithically formed.

Further, the left and right frame bodies 41 and 43 are joined along edges thereof so as to form an overall configuration of the frame unit 1 for a bicycle.

The left and right frame bodies 41 and 43 are joined to each other by a welding method, and in this case, the welding method may be an arc welding method or the like.

Figure 5:
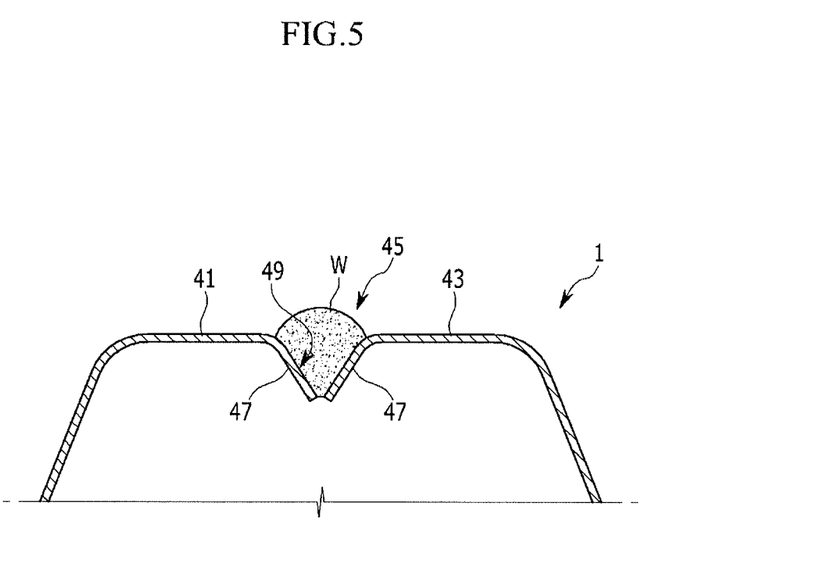
FIG. 5 and FIG. 6 are partially enlarged cross-sectional views taken along line A-A of FIG. 3.
Figure 6:
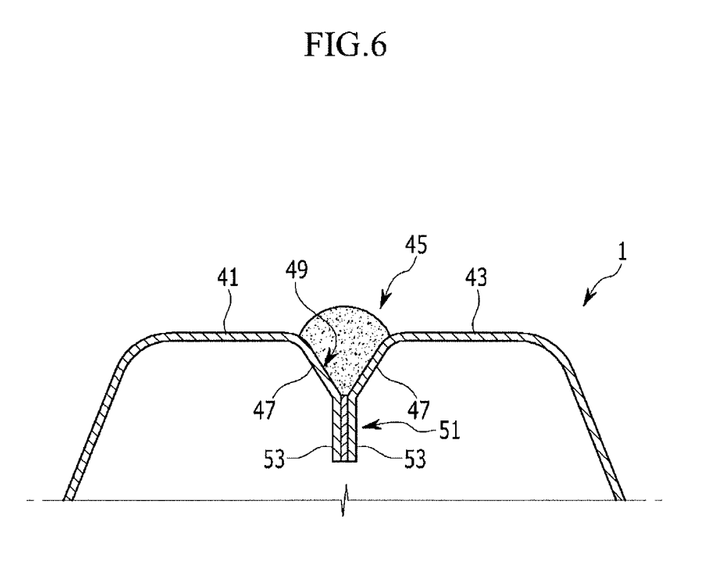

FIGS. 5 and 6 are partially enlarged cross-sectional views taken along line A-A of FIG. 3.

Referring to FIG. 5, joining portions 45 are formed at the edges of the left and right frame bodies 41 and 43, respectively.

The joining portion 45 forms a V-shaped joining groove portion 49 by flanges 47 that are formed to be inclined inward so as to face each other along the edges of the left and right frame bodies 41 and 43.

Further, the left and right frame bodies 41 and 43 are joined to each other by the joining groove portion 49 so as to form an overall configuration of the frame unit 1 for a bicycle.

Here, the left and right frame bodies 41 and 43 are joined by a welding method, and may be welded by a $CO_2$ welding method by inserting a filler metal into the joining groove portion 49.

The joining portion 45 facilitates weld penetration (column) by the joining groove portion 49, which is formed by the V-shaped flanges 47, when the left and right frame bodies 41 and 43 are joined, and improves joint strength by increasing a welding contact area.

Further, because weld beads W are formed in the V-shaped joining groove portion 49, a height of the weld bead W is relatively lower than that of a weld bead formed by a general butt welding method or a lap welding method, the weld beads W are prevented from flowing down, and quality in external appearance of the weld bead W is improved.

Meanwhile, the joining portion 45 may further include bonding portions 51 formed at an end of each of the flanges 47 of the left and right frame bodies 41 and 43.

Referring to FIG. 6, the bonding portions 51 may be bonded with each other by extension ends 53 that are formed to be extended inward from the ends of the respective flanges 47 of the left and right frame bodies 41 and 43.

Here, the bonding portions 51 may be adhered to each other by applying a structural adhesive such as a hot melt adhesive between inner surfaces of the extension ends 53.

According to the frame unit 1 for a bicycle according to various embodiments of the present invention, which has the aforementioned configuration, the head tube 3, the seat tube 5, the frame 7, the pedal assembly 9, and the left and right stays 11 and 11a are integrally formed with each other such that residual stress due to welding heat at a joining portion in the related art may be minimized, and a factor, which causes joint rigidity deterioration, may be eliminated.

In addition, an occurrence of a safety accident due to cracks and damage which have occurred at the joining portion is reduced, and particularly, rigidity and durability between the head tube 3 and the frame 7 with respect to an impact load transmitted from a road surface and a fatigue load of the frame unit per se are firmly maintained.

Further, the left and right frame bodies 41 and 43, which form the frame unit 1 for a bicycle, are integrally formed, thereby making the entire external appearance of the frame unit 1 for a bicycle be aesthetically attractive.

In addition, the weld beads W, which occur when the left and right frame bodies 41 and 43 are joined, are not directly exposed to a surface because the V-shaped joining groove portion 49 is formed, such that an influence on the entire external appearance design of the frame unit 1 for a bicycle is minimized.

In addition, welding work is performed along the edges of the left and right frame bodies 41 and 43 through the joining portions 45 when the left and right frame bodies 41 and 43 are joined, such that welding processes may be automated, working times may be reduced due to the automation, and welding quality and productivity may be improved.

Hereinafter, a method of manufacturing the frame unit 1 for a bicycle according to various embodiments of the present invention, which has been described above, will be described with reference to FIGS. 3 to 6.

First, a part of the head tube 3, a part of the seat tube 5, a part of the frame 7, a part of the pedal assembly 9, and the left and right stays 11 and 11a are integrally trimmed and formed, respectively, and thereafter, the left and right frame bodies 41 and 43, which are symmetric to each other, are press-formed, respectively, as illustrated in FIG. 4.

In this case, the joining portions 45 are formed between the left and right frame bodies 41 and 43, which are formed by a press, along the edges of the left and right frame bodies 41 and 43.

As illustrated in FIG. 5, as the flanges 47 are formed to be inclined so as to face each other along the edges of the left and right frame bodies 41 and 43, the joining portion 45 forms the joining groove portion 49 formed as a V-shaped groove.

Further, the left and right frame bodies 41 and 43 are joined to each other by a welding method through the joining groove portion 49 such that the frame unit 1 for a bicycle is manufactured, as illustrated in FIG. 3.

Here, in order to form an inclined surface, the flange 47 may be formed by a cam process and a restriking process in consideration of an inclination angle of the flange 47, and the welding method may be a $CO_2$ welding method in which the left and right frame bodies 41 and 43 are welded by inserting the filler metal into the joining groove portion 49.

Meanwhile, when the extension ends 53, which are vertically connected to each other, are formed on the ends of the respective flanges 47 of the left and right frame bodies 41 and 43, as illustrated in FIG. 6, the inner surfaces of the extension ends 53 form the bonding portions 51 where the inner surfaces of the extension ends 53 are bonded by an adhesive, respectively.

In the bonding portions 51, a structural adhesive is applied on the inner surfaces of the extension ends 53, and the inner surfaces of the extension ends 53 may be adhered to each other by welding heat generated when the welding work is performed with respect to the joining portions 45.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A frame unit for a bicycle comprising:
   a left frame body including a part of a head tube, a part of a seat tube, a part of a frame, and a left stay integrally formed together; and a right frame body including a part of the head tube, a part of the seat tube, a part of the frame, and a right stay integrally formed together;

wherein the left frame body and the right frame body are coupled to integrally form the head tube, the seat tube, and the frame;

wherein flanges are formed inclined along edges of the left frame body and the right frame body, respectively, and the left frame body and the right frame body are coupled through the flanges; and wherein a joining groove portion is formed between the flanges.

2. The frame unit of claim 1, wherein:

the left frame body and the right frame body are welded and coupled by inserting a filler metal into the joining groove portion.

3. The frame unit of claim 1, further comprising:

extension ends formed to be extended from ends of the respective flanges of the left and right frame bodies and coming into contact with each other.

4. The frame unit of claim 3, wherein:

the extension ends are adhered to each other by applying an adhesive on the respective extension ends.

5. A method of manufacturing a frame unit for a bicycle including a head tube to which a steering shaft is installed, a seat tube to which a seat pipe is installed, a frame configured to integrally connect the head tube and the seat tube and form a body of a bicycle, and left and right stays formed at the rear of the frame, the method comprising:

press-forming a left frame body so that a part of the head tube, a part of the seat tube, a part of the frame, and the left stay are integrally formed, and a flange is formed inclined along an edge of the left frame body; and press-forming a right frame body so that a part of the head tube, a part of the seat tube, a part of the frame, and the right stay are integrally formed, and a flange is formed to be inclined along an edge of the right frame body;

wherein a joining groove portion is formed between the flanges; and wherein the left and right frame bodies are coupled through the respective flanges.

6. The method of claim 5, wherein:

the left frame body and the right frame body are welded and coupled by welding the left frame body and the right frame body through the joining groove portion.

7. The method of claim 6, wherein:

the left frame body and the right frame body are welded and coupled by inserting a filler metal into the joining groove portion.

8. The method of claim 6, wherein:

the joining groove portion is formed as a V-shaped groove by the flanges facing each other.

9. The method of claim 6, wherein:

the respective flanges of the left and right frame bodies are extended to form extension ends; and an adhesive is applied on each of the extension ends, and the extension ends are adhered to each other by welding heat generated at the joining groove portion.

10. The method of claim 5, wherein:

the respective flanges of the left and right frame bodies are extended to form extension ends; and the extension ends are adhered to each other by applying an adhesive on the respective extension ends.

* * * * *